United States Patent [19]

Tsuji et al.

[11] 4,343,831

[45] Aug. 10, 1982

[54] PROCESS FOR PRODUCING MAGNETIC RECORDING MEDIUM

[75] Inventors: Nobuo Tsuji; Goro Akashi; Masaaki Fujiyama; Yasuyuki Yamada, all of Odawara, Japan

[73] Assignee: Fuji Photo Film Co., Ltd., Kanagawa, Japan

[21] Appl. No.: 243,666

[22] Filed: Mar. 13, 1981

[30] Foreign Application Priority Data

Mar. 13, 1980 [JP] Japan .................................. 55/32085

[51] Int. Cl.$^3$ ............................................. B05D 3/06
[52] U.S. Cl. ..................................... 427/44; 427/128; 427/130
[58] Field of Search .......................... 427/44, 127–132, 427/48; 428/900, 694; 252/62.54

[56] References Cited

U.S. PATENT DOCUMENTS 3,104,983  9/1963  Tarwater et al. ................. 427/44 X Primary Examiner—Bernard D. Pianalto
Attorney, Agent, or Firm—Sughrue, Mion, Zinn, Macpeak & Seas

[57] ABSTRACT

A process for producing a magnetic recording medium is described comprising applying to a support a coating solution which has ferromagnetic particles dispersed in a solution comprising a binder curable by electron beams and a low-boiling point solvent, irradiating the support with electron beam radiation while the particles remain dispersed uniformly, and evaporating the solvent to dryness.

9 Claims, No Drawings

PROCESS FOR PRODUCING MAGNETIC RECORDING MEDIUM

BACKGROUND OF THE INVENTION

This invention relates to a process for producing a magnetic recording medium comprising a support coated with ferromagnetic particles dispersed in a binder. More particularly, the invention relates to a process for producing a magnetic recording medium having a uniform dispersion of magnetic particles and an improved signal-to-noise (S/N) ratio.

Recent expansions in the applications of magnetic recording media have given rise to a demand for a magnetic recording medium having an improved S/N ratio, and this improved S/N ratio is particularly desirable when the medium is video tape or audio tape. Desirable S/N ratios require, among other things, a uniform dispersion of magnetic particles, and the conventional techniques for improving the dispersibility of magnetic particles and reducing tape noise include the following: (1) reducing the size of the magnetic particles; (2) adding a dispersant (e.g., surfactant); (3) adding an agent to prevent particle reaggregation (e.g., solid particles); and (4) using a powerful dispersing mill. However, it has been found that even if a coating solution having a good dispersion of magnetic particles is initially applied to a support, the particles reaggregate during drying to provide a coating in which the particles are no longer dispersed uniformly. A highly viscous coating solution and an agent to prevent the reaggregation of magnetic particles (solid particles) are effective to some extent, but they find only limited utility because the high-viscosity coating solution is difficult to filter and to apply to the support and too large solid particles (e.g., greater than 5 $\mu$m in average diameter) cannot be used.

SUMMARY OF THE INVENTION

This invention provides a process for producing a very smooth coating film wherein ferromagnetic particles are dispersed uniformly. According to this process, a coating solution wherein ferromagnetic particles are dispersed in a solution comprising a binder which is curable by electron beam radiation (hereinafter referred to generically as "curable by electron beam radiation") (said binder is preferably a high-boiling point monomer (also referred to as high-boiling monomer) and/or a low molecular weight polymer) and a low-boiling point solvent (also referred to as low-boiling solvent) is applied to the support, and after the application while the magnetic particles remain dispersed uniformly, the coated solution is irradiated with electron beam radiation to cure the binder system in the presence of the solvent to thereby prevent the reaggregation of the magnetic particles, and thereafter the solvent is evaporated to dry the coated film.

DETAILED DESCRIPTION OF THE INVENTION

Using electron beam radiation to produce magnetic recording tape is described in Japanese Patent Publication No. 12423/72, but the technique described in that publication differs greatly from the process of this invention. According to the prior art technique, a composition wherein ferromagnetic particles are dispersed in a mixture of a binder system curable by electron beams and a low-boiling solvent is applied to a plastic base film, and the film is preliminarily heated to remove the low-boiling solvent, and then, the film is irradiated with electron beams to cure the binder system curable by electron beams (including the magnetic particles). But in the process of this invention, the low-boiling solvent is not evaporated first, but rather, the applied coating solution (i.e., dispersion) is first irradiated with electron beams. Stated more specifically, in the prior art technique, the magnetic particles which were dispersed uniformly in the coating solution reaggregate during evaporation of the solvent after application, and, as a consequence, the coated film no longer contained a uniform dispersion of the magnetic particles.

In contrast, in the process of the present invention, a dispersion of magnetic particles in a binder system is applied to the support, and, while still uniformly dispersed, the support is irradiated with electron beam radiation so as to prevent the reaggregation of the magnetic particles by rapid curing of the binder system. As a result, the support has formed thereon a film wherein the magnetic particles are dispersed very uniformly in the binder system.

Another advantage of this invention is that upon irradiation with electron beams, the binder system cures to fix the magnetic particles but the film obtained is swollen because it still contains the low-boiling solvent. Therefore, by selecting proper conditions for evaporation of the solvent in the subsequent step, a film of spongy structure with voids from which the solvent has evaporated can be obtained. The voids can serve as pits to retain a lubricant that can be used to enhance the running property of the magnetic recording medium, and they also help prevent or control curling of the magnetic recording medium when it is in the form of a tape.

Another advantage of the voids is that a very thin film can be produced by subsequent calendering. This means that the effect of calendering is greatly increased, thereby facilitating the production of a layer of magnetic particles with a smooth surface wherein the particles are dispersed uniformly throughout the thickness of the layer. All of these facts result in the achievement of a magnetic recording medium having improved S/N ratio.

None of these advantages are described in Japanese Patent Publication No. 12423/72 and other prior art references, and they are obtainable only from the process of this invention wherein a coating solution applied to the support is first irradiated with electron beams to achieve the curing of the binder system and the fixing of the magnetic particles simultaneously.

The use of the calendering step in the manufacture of a magnetic recording medium according to the process of this invention is an optional but preferred embodiment. In the process of this invention, since the binder system solidifies before evaporation of the solvent which is accompanied by formation of a rough magnetic surface or reaggregation of magnetic particles, the resulting film has good surface properties even without performing the calendering step and may not need to be calendered. If calendering is desired, it may be performed after evaporation of the solvent from the binder system cured by irradiation with electron beams, or it may be performed while the binder system contains all or a part of the solvent used. One advantage of calendering the film while it is wet or partially dry is that mild calendering conditions (relatively low temperature and pressure) can be employed.

In consequence, the process of this invention can achieve simultaneously the formation of a uniform dispersion of magnetic particles and the provision of a magnetic layer having a high degree of smoothness, and it provides a magnetic recording medium having high S/N ratio that has not previously been obtainable.

Examples of the binder system that is curable by electron beam radiation include low molecular weight polymer curable by electron beam radiation and/or high-boiling monomer curable by electron beam radiation. More particularly, examples that can be used in this invention include (I) an acrylic prepolymer; (II) an unsaturated polyester prepolymer; and (III) a high-boiling monomer. The binder system is preferably composed of a mixture of (I) and (III), (II) and (III), or (I), (II) and (III). The binder can be prepared by blending a prepolymer, such as (I), (II), or a mixture of (I) and (II), with the high-boiling monomer (III) in a weight ratio of from 1:9 to 9:1.

More specifically, examples of the acrylic prepolymer (I) include a copolymer made of one or more alkyl esters of acrylic acid and one or more alkyl esters of methacrylic acid as described in Japanese Patent Publication No. 12423/72, a copolymer or homopolymer made up of one or more alkyl esters of acrylic acid, and a copolymer comprising from 50 to 99.5 wt% of at least one of the monomers specified above and from 0.5 to 50 wt% of another vinyl monomer copolymerizable with such monomer; examples of the alkyl group of the alkyl ester of acrylic or methacrylic acid that is used to synthesize the prepolymer include methyl, ethyl, n-propyl, n-butyl, iso-butyl, t-butyl, 2-ethylhexyl, lauryl and stearyl; examples of the vinyl monomer copolymerizable with these monomers include acrylic acid, methacrylic acid, itaconic acid, α-methyleneglutaric acid, aconitic acid, styrene or derivatives thereof, such as α-methyl styrene, β-chlorostyrene, p-bromostyrene, organic nitriles such as acrylonitrile, methacrylonitrile, methylene glutaronitrile, and vinyl esters of organic acids, such as vinyl acetate, vinyl propionate and vinyl isopropionate.

The unsaturated polyester prepolymer of (II) is an unsaturated polyester composed of a saturated polybasic acid, unsaturated polybasic acid and polyhydric alcohol. Examples of saturated polybasic acid include succinic acid, adipic acid, sebacic acid, phthalic acid, isophthalic acid, terephthalic acid, 2,5-dimethylterephthalic acid, thiodivalerianic acid, and trimellitic acid; examples of the unsaturated polybasic acid include maleic anhydride, maleic acid and fumaric acid; and examples of the polyhydric alcohol include ethylene glycol, diethylene glycol, triethylene glycol, propylene glycol, 2,2-dimethyl-1,3-propanediol, 1,3-butanediol, 1,5-pentanediol, 1,6-hexanediol, 1,10-decanediol, neopentyl glycol, 2-ethyl-1,3-hexanediol, trimethylolpropane and pentaerythritol.

Any monomer whose boiling point is sufficiently high for the monomer to remain in the binder system after removal of the low-boiling solvent by preliminary drying can be used as the high-boiling monomer (III). Monomers having a boiling point of from about 150° to about 250° C. are preferably used for the purpose. Specific examples of the monomer include acrylic or methacrylic acid esters of alkyls having 6 or more carbon atoms (e.g., hexyl, 2-ethylhexyl, lauryl, decyl and stearyl esters), high-boiling hydroxy acrylates or hydroxy maleates, i.e., 2-hydroxypropyl acrylate, 4-hydroxybutyl acrylate, 2-hydroxyethyl methacrylate, 6-hydroxyhexyl methacrylate, mono(2-hydroxyethyl)maleate, di(2-hydroxyethyl)maleate, acrylamide, and methacrylamide. Better results are obtained if these monomers are used in combination with a high-boiling point monomer having two or more vinyl groups to achieve faster cross-linking, such as divinyl styrene, ethylene glycol dimethacrylate, triethylene glycol dimethacrylate, tetraethylene glycol dimethacrylate, N,N'-methylenebisacrylamide, 1,3-butylene dimethacrylate, diallyl phthalate, trimethylolpropane tri(meth)acrylate, and pentaerythritol tri(meth)acrylate.

Other non-limiting examples of the prepolymers (I) and (II) include a composition as described in Japanese Patent Application (OPI) No. 17517/77 (the term "OPI" as used herein means a Japanese unexamined published patent application) having a compound terminated with a (meth)acrylate group that is obtained by bonding a terminal hydroxyl group of polyester polyurethane to hydroxyalkyl (meth)acrylate by a diisocyanate compound; an acrylated urethane compound or a composition which has said compound as described in Japanese Patent Application (OPI) No. 57023/78; and a composition as described in Japanese Patent Application (OPI) No. 21035/77 which is composed of a saturated acrylic copolymer and a polyfunctional unsaturated radical polymerizable compound having both OH group and ether bond in the molecule. Other examples of the high-boiling monomer include but are not limited to the polyvalent acrylates and acrylamide compounds described in the *Journal of Applied Polymer Science*, Vol. 23, p. 3229 (1979), as well as the monoallylidene pentaerythritol, diallylidene pentaerythritol described in *Kobunshi Kako* (Polymer Processing), February, p. 29 (1977) or prepolymers thereof.

More specifically, a composition containing a variety of acrylic unsaturated compounds which is available from Toagosei Chemical Co., Ltd. under the trade name "Alonics" may be used. A typical example of the diallylidene pentaerythritol is a compound available from Showa Highpolymer Co., Ltd. under the trademark "Spilac".

The binder system of this invention that is curable by electron beam radiation may further contain a polymeric binder used to disperse magnetic particles in the manufacture of the conventional magnetic tape. Examples of such polymeric binder are polyurethane, polyester, epoxy resin, vinyl chloride acetate resins, and polyvinylidene chloride.

The ferromagnetic particles used in this invention may be made of iron oxide, iron oxide plus another metal such as cobalt, metal particles containing at least one of $CrO_2$, Fe, Ni and Co, and MnB.

Generally, a suitable weight ratio of the magnetic particles to the binder in the dispersion of the magnetic particles is in the range of from 100:10 to 100:400. Theoretically, the binder system could be formed solely of low molecular polymers curable by electron beam radiation and/or high-boiling monomer which is also curable by electron beam radiation, but it is difficult to disperse the magnetic particles in such binder system completely uniformly. Therefore, in the actual practice of this invention, the binder system is diluted with a suitable amount of low-boiling solvent to form a coating solution wherein the magnetic particles are uniformly dispersed and which is easy to apply. The resulting coating solution is applied to the support which is then irradiated with electron beam radiation to cure the binder system, and then the unwanted low-boiling solvent is removed by evaporation. Useful low-boiling point solvents include those having a boiling point of from about 40° to about 200° C., such as acetone, methyl ethyl ketone, methyl isobutyl ketone, ethyl acetate, butyl acetate, cyclohexanone, butanol, toluene and xylene.

The coating solution is applied to the support by a suitable method, such as doctor blade coating, reverse roll coating, gravure coating, gravure offset coating, wire bar coating, and slit nozzle spray coating. An appropriate method is selected depending upon the state of the surface of the support, the desired thickness of the coating, the application speed, and other factors.

The applied coating solution is then irradiated with electron beam radiation by either a beam scanning method or an electrocurtain method, using an accelerator providing an acceleration voltage of from 0.1 to 2.0 MeV, and preferably from 0.2 to 0.6 MeV, at a dose rate of from 0.1 to 2.0 Mrad/sec (rad = 100 erg/g) to provide a total dose of from 0.5 to 20 Mrad. An acceleration voltage of less than 0.1 MeV does not achieve adequate energy transmission, and an acceleration voltage of more than 2.0 MeV reduces the percentage utilization of the beam energy that contributes to the polymerization. Furthermore, such a high acceleration voltage causes the coating film to generate excessive heat and requires the provision of expensive protection against radioactivity.

The nonmagnetic support used in this invention may be made of a polyester such as polyethylene terephthalate or polyethylene-2,6-naphthalate, a polyolefin such as polypropylene, a cellulose derivative such as cellulose triacetate or cellulose diacetate, plastics such as polycarbonate and aromatic polyamide, nonmagnetic metals such as Cu, Al and Zn, and ceramics such as glass, porcelain and earthware. The nonmagnetic support may assume a variety of forms such as film, tape, sheet, disc, card or drum, and the proper material is selected depending upon the form. The nonmagnetic support typically has a thickness of from about 2 to 50 $\mu$m, and preferably from 3 to 25 $\mu$m, when it is a film, tape or sheet, and has a thickness of from about 0.5 to 10 mm when it is in the form of a disc or card. When the support is in the form of a drum, a cylindrical drum shape is typically selected. The specific form of the support is determined by the type of the magnetic recorder used. The thickness of the magnetic layer provided on the support is preferably from about 0.3 to about 20 $\mu$m.

When the nonmagnetic support is a flexible support such as film, tape, sheet or thin flexible disc, it may have a back coating on the surface opposite to the side coated with the magnetic layer. The purposes of the back coating may be to prevent static buildup, print-through, and wow/flutter. For details of the formation of the back coating, see, for example, U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,166,688 and 3,761,311.

The magnetic particles, the binder and solvent system described above, as well as other conventional additives such as a dispersant, a lubricant, an abrasive, an antistat, and other suitable additives are blended to form a magnetic coating solution. The magnetic particles, binder, solvent, and other additives identified above may be charged into a blending machine either simultaneously or separately. For instance, a solvent containing a dispersant can first be mixed with the magnetic particles, and then the other ingredients can be added to the mixture under agitation for a predetermined period.

To produce a uniform dispersion of the ingredients, various blending machines can be used, such as two-roll mill, three-roll mill, ball mill, pebble mill, trommel, sand grinder, Szegvari attritor, high-speed impeller disperser, high-speed stone mill, high-speed impact mill, disperser, kneader, high-speed mixer, homogenizer and ultrasonic disperser. For details of the techniques for producing a uniform dispersion, see T. C. Patton, *Paint Flow and Pigment Dispersion*, 1964, John Wiley & Sons, as well as in U.S. Pat. Nos. 2,581,414 and 2,855,156.

The resulting magnetic recording layer may, of course, contain dispersant, lubricant, abrasive, antistat and other suitable additives in addition to the binder and solvent system and ferromagnetic particles.

Examples of the dispersant include aliphatic acids $R_1COOH$ having from 12 to 18 carbon atoms (wherein $R_1$ is an alkyl or alkenyl group having from 11 to 17 carbon atoms) such as caprylic acid, capric acid, lauric acid, myristic acid, palmitic acid, stearic acid, oleic acid, elaidic acid, linoleic acid, linolenic acid and stearolic acid; metal soaps comprising alkali metals (e.g., Li, Na, and K) or alkaline earth metals (e.g., Mg, Ca, and Ba) of these aliphatic acids; compounds that are esters of these aliphatic acids and which contain fluorine; amides of the above aliphatic acids; polyalkyleneoxide alkylphosphate; lecithin; and trialkylpolyolefinoxy quaternary ammonium salt (wherein the alkyl has from 1 to 5 carbon atoms, and the olefin is ethylene, propylene, etc.). Other examples are higher alcohols having at least 12 carbon atoms and sulfuric acid esters thereof. These dispersants are used in an amount of from 0.5 to 20 parts by weight per 100 parts by weight of the binder. A more detailed description of such dispersants is provided in Japanese Patent Publication Nos. 28369/64, 17945/69, 7441/73, 15001/73, 15002/73, 16363/73, and 4121/75, and U.S. Pat. Nos. 3,387,993 and 3,470,021.

Examples of the lubricant include an electrically conductive fine powder such as carbon black, graphite, or a carbon black graft polymer as described in K. Nollen, et al., *Angew. Makromol. Chem.*, 6, 1 (1969); a fine inorganic powder such as molybdenum dioxide or tungsten disulfide mica; a fine plastic powder such as polyethylene, polypropylene, ethylene-vinyl chloride copolymer, or polytetrafluoroethylene; an $\alpha$-olefin polymer; an unsaturated aliphatic hydrocarbon which is liquid at ordinary temperature (e.g., a compound having an n-olefin double bond attached to a terminal carbon and which contains up to about 24 carbon atoms); and an aliphatic acid ester made up of a monobasic aliphatic acid having from 12 to 26 carbon atoms and a monovalent alcohol having from 3 to 12 carbon atoms. An organic silicone compound can also be used as a lubricant. These lubricants are used in an amount of from 0.2 to 20 parts by weight based on 100 parts by weight of the binder. For details of the lubricant, see Japanese Patent Publication Nos. 18064/66, 23889/68, 40461/71, 15621/72, 18482/72, 28043/72, 32001/72, 5042/75, U.S. Pat. Nos. 3,470,021, 3,492,235, 3,497,411, 3,523,086, 3,625,760, 3,630,772, 3,642,539, *IBM Technical Disclosure Bulletin*, Vol. 9, No. 7, p. 779, December, 1966, *Elektronik*, No. 12, p. 380, 1961, Japanese Patent Application (OPI) Nos. 108804/77, 24806/78, 125803/78, and Japanese Patent Publication No. 34923/77. These lubricants may be used independently, or are more often used as a mixture.

The abrasive may be made of conventional abrasive materials such as fused alumina, silicon carbide, chromium oxide, corundum, artificial corundum, diamond, artificial diamond, garnet and emery (composed mainly of corundum and magnetite). These abrasives have a hardness of at least 5 on the Mohs' scale, and they have an average particle size between about 0.05 and 5 μm, and preferably between 0.1 and 2 μm. These abrasives are typically used in an amount of from 0.5 to 20 parts by weight per 100 parts by weight of the binder. A more detailed description of such abrasives is provided in Japanese Patent Publication Nos. 18572/72, 15003/73, 15004/73 (see U.S. Pat. No. 3,617,378), 39402/74, and 9401/75, U.S. Pat. Nos. 3,007,807, 3,041,196, 3,293,066, 3,630,910, and 3,687,725, British Pat. No. 1,145,349, and West German Pat. (DT-PS) Nos. 853,211 and 1,101,000.

Examples of the antistat are carbon black, graphite, and carbon black graft polymer.

To provide a smooth surface, the magnetic layer can be calendered, and such calendering can be performed after complete removal of the solvent or while the magnetic layer is still wet. A preferred calendering method is "super calendering", wherein the magnetic layer and support are passed between a metal roll and a cotton roll or synthetic resin roll (e.g., nylon roll). Conditions for the super calendering preferably are: a nip pressure of from about 25 to 100 kg/cm, and preferably from 30 to 70 kg/cm, a temperature of from about 35° to 100° C., and preferably from 40° to 80° C., and a calendering speed of from about 5 to 120 m/min. If the temperature and pressure exceed these upper limits, the magnetic layer and the nonmagnetic support are adversely affected. If the calendering speed is slower than about 5 m/min, the intended smoothness is not obtained, and if the speed is faster than about 120 m/min, calendering becomes difficult. A more detailed description of such calendering is provided in U.S. Pat. Nos. 2,688,567, 2,998,325, and 3,783,023, West German Patent Application (DT-OS) No. 2,405,222, and Japanese Patent Application (OPI) Nos. 53631/74 and 10337/75.

This invention is now described in greater detail by reference to the following examples, which are provided for illustrative purposes, and are not intended to limit the scope of the invention. In the examples, all parts are by weight.

EXAMPLES 1 TO 3

A dispersion of magnetic particles curable by electron beam radiation was prepared by mixing the following formulation using a ball mill for about 24 hours.

|  | parts |
|---|---|
| γ-Fe$_2$O$_3$ | 100 |
| Low molecular weight polymer (see Table 1 below) | } 30~40 |
| High-boiling monomer (see Table 1 below) | |
| Soybean lecithin | 1 |
| Hexyl laurate | 0.75 |
| Myristic acid | 1 |
| Methyl ethyl ketone | 150 |
| Methyl isobutyl ketone | 50 |

The resulting viscous dispersions were coated by a doctor blade onto a polyethylene terephthalate film support (15μ thick) to obtain layers having a dry thickness of 5μ. Immediately after the application, the tapes were irradiated with electron beams from an accelerator (produced by Energy Science Inc.) at an acceleration voltage of 0.5 MeV, a beam current of 5 mA, and a dose rate of 2 Mrad/sec, to provide a total dose of 10 Mrad. The irradiation caused immediate curing of the binder systems, but the tapes remained wet. The tapes were then passed through a drying zone (80°–110° C.) to evaporate the low-boiling solvents completely. The thus-treated tapes Nos. 1(b), 2(b) and 3(b) were calendered by conventional means used in the manufacture of magnetic tape, and were slit into magnetic video tapes having a width of ½ inch.

Three control magnetic tapes (Nos. 1(a), 2(a), and 3(a)) were prepared by repeating the above procedure except that the film coated with the dispersion was irradiated with electron beam radiation after removal of the low-boiling solvents by evaporation. The control tapes were compared with the magnetic tapes of this invention for the smoothness (surface roughness) of the magnetic layer and the S/N ratio of color signals. The results are shown in Table 2, from which it can be seen that the tapes obtained by performing irradiation with electron beams to cure the binder system before removal of the solvent have a smooth magnetic layer (which is low in surface roughness) and achieve a high S/N ratio of color signals as compared with the control tapes that were produced by performing irradiation with electron beam radiation after removal of the solvent. The tapes of this invention exhibited very good operating properties even in an atmosphere of high temperature and high humidity.

TABLE 1

Composition of Binder System

| Example | Binder Composition | |
|---|---|---|
| No. 1 | "Alonics M-8030" (Toagosei Chemical Co., Ltd.) | 10 parts |
|  | "Alonics M-6100" (Toagosei Chemical Co., Ltd.) | 10 parts |
|  | 2-Ethylhexyl acrylate | 10 parts |
|  | Urethane elastomer "Nipporan N-2301" (Nippon Polyurethane Industry Co., Ltd.) | 5 parts |
| No. 2 | "Spilac E-4000" (Showa Highpolymer Co., Ltd.) | 10 parts |
|  | Trimethylolpropane triacrylate | 10 parts |
|  | 2-Ethylhexyl acrylate | 15 parts |
| No. 3 | Unsaturated polyurethane resin solution described in Example 1 of Japanese Patent Application (OPI) No. 17517/77. | 30 parts |
|  | Trimethylolpropane triacrylate | 5 parts |

TABLE 2

Characteristics of Magnetic Tape

| Example | Timing of Irradiation with Electron Beams | Surface Roughness of Magnetic Layer Ra* (μ) | S/N for Color Signal** (dB) |
|---|---|---|---|
| No. 1 | (a) After removal of solvent | 0.030 | 0 dB |
|  | (b) Before removal of solvent | 0.015 | +2.5 dB |
| No. 2 | (a) After removal of Solvent | 0.032 | +0.2 dB |
|  | (b) Before removal of solvent | 0.019 | +2.2 dB |
| No. 3 | (a) After removal of solvent | 0.033 | −0.2 dB |
|  | (b) Before removal of solvent | 0.024 | +1 dB |

*Center-line average roughness was measured with a probe surface roughness meter of Tokyo Seimitsu Co., Ltd.
**Based on the S/N value of Example No. 1(a) as standard.

EXAMPLE 4

A magnetic tape was prepared by repeating the procedure of Example 1, except that the magnetic particles of γ-Fe$_2$O$_3$ were replaced by magnetic particles made of an Fe-containing metal. A control tape was prepared in the same manner, except that irradiation with electron beam radiation was conducted after removal of the solvent. The magnetic tape produced by the method of this invention had a smoother magnetic layer than the control tape, and achieved an S/N ratio of color signal 1.8 dB higher than the control tape.

EXAMPLE 5

A magnetic tape was prepared by repeating the procedure of Example 1, with the following exceptions: the film coated with the dispersion of magnetic particles was immediately irradiated with electron beam radiation, the tape was dried by evaporating the solvent until the residual solvent content was about 3% of the layer's weight, the partially dried tape was calendered, and then the calendered tape was passed through a final drying zone to remove the residual solvent. The resulting magnetic tape was a high-quality video tape having a surface roughness of 0.01μ in the magnetic layer and achieved an S/N ratio for color signal of +3.0 dB.

While the invention has been described in detail and with reference to specific embodiments thereof, it will be apparent to one skilled in the art that various changes and modifications can be made therein without departing from the spirit and scope thereof.

What is claimed is:

1. A process for producing a magnetic recording medium comprising applying to a support a coating solution containing ferromagnetic particles dispersed in a solution including a binder curable by electron beam radiation and a lowboiling point solvent, irradiating the support with electron beam radiation while the particles remain dispersed uniformly prior to any substantial evaporation of the solvent, and then evaporating the solvent to dryness.

2. A process as in claim 1, wherein said binder is a high-boiling point monomer.

3. A process as in claim 1, wherein said binder is a mixture of low molecular weight polymers.

4. A process as in claim 1, wherein said binder is a mixture of a high-boiling point monomer and low molecular weight polymer.

5. A process as in claim 1, 2, 3, or 4, wherein after evaporating the solvent to dryness the support and resulting coating layer are calendered.

6. A process as in claim 2 or 4, comprising a high-boiling point monomer having two or more vinyl groups.

7. A process as in claim 1, 2, 3, or 4, wherein the weight ratio of the magnetic particles to the binder is from 100:10 to 100:400.

8. A process as in claim 1, 2, 3, or 4, wherein the electron beam radiation is provided at an acceleration voltage of from 0.1 to 2.0 Mrad/sec to provide a total dose of from 0.5 to 20 Mrad.

9. A process as in claim 8, wherein the acceleration voltage is from 0.2 to 0.6 MeV.

* * * * *